United States Patent
Palmquist et al.

(10) Patent No.: US 7,875,827 B2
(45) Date of Patent: Jan. 25, 2011

(54) LASER BRAZING IMPROVEMENT WITH TWINSPOT

(75) Inventors: Niclas Palmquist, Torslanda (SE); Per Lindahl, Lindome (SE); Urban Todal, Kungälv (SE); Esa P Laurila, Skene (SE); Glen Peter Hopkins, Härryda (SE); Martin Strömblad, Öckerö (SE); Reik Steinert, Mölndal (SE); Lukas Jönsson, Lindome (SE)

(73) Assignee: Volvo Car Corporation, Gothenburg (SE)

( * ) Notice: Subject to any disclaimer, the term of this patent is extended or adjusted under 35 U.S.C. 154(b) by 325 days.

(21) Appl. No.: 11/938,419

(22) Filed: Nov. 12, 2007

(65) Prior Publication Data

US 2009/0114625 A1    May 7, 2009

(30) Foreign Application Priority Data

Nov. 13, 2006    (EP)    .................................. 06123932

(51) Int. Cl.
*B23K 26/00*    (2006.01)
*B23K 1/002*    (2006.01)
(52) U.S. Cl. .................................. 219/121.64; 219/85.1
(58) Field of Classification Search . 219/121.6–121.86, 219/136, 137 R, 85.1–85.15
See application file for complete search history.

(56) References Cited

U.S. PATENT DOCUMENTS

| | | | | |
|---|---|---|---|---|
| 6,191,379 B1 * | 2/2001 | Offer et al. | ..................... | 219/75 |
| 2004/0009964 A1 | 1/2004 | Capelli | | |
| 2006/0261045 A1 | 11/2006 | Wang et al. | | |

FOREIGN PATENT DOCUMENTS

| | | |
|---|---|---|
| DE | 10261422 | 7/2004 |
| DE | 10113471 | 2/2005 |
| JP | 60-234768 | 11/1985 |
| JP | 63-168272 | 7/1988 |
| JP | 7-211424 | 8/1995 |
| JP | 2005-279686 | 10/2005 |

\* cited by examiner

*Primary Examiner*—Sang Y Paik
(74) *Attorney, Agent, or Firm*—Burgess Law Office, PLLC (57) ABSTRACT

The present invention provides a method for laser brazing a first member to a second member using a laser brazing head. The laser brazing head has means for generating a first laser beam and a second laser beam. The method comprises the steps of: arranging the first member in contact with the second member such that a junction is formed there-between; providing a filler material in the vicinity of said junction, and passing the laser brazing head along the junction such that the first laser beam melts the filler material to at least partially fill said junction to form a brazed joint. The second laser beam then effects a post heat treatment of the brazed joint.

12 Claims, 6 Drawing Sheets

LASER BRAZING IMPROVEMENT WITH TWINSPOT

TECHNICAL FIELD

The present invention relates to a method of laser brazing, using a post heat treatment to reduce or eliminate the presence of defects in the brazed joint.

BACKGROUND OF THE INVENTION

Brazing is a common technique used to join two close-fitting surfaces. It involves placing a filler material such as a metal or metal alloy in the junction between two surfaces and applying heat so that the filler material melts. The filler material can then flow at least partially into the junction and solidify to form a brazed joint, thus bonding the two surfaces tightly together. The filler material and the material of the surfaces often partially dissolve one another at the interface, leading to strong bonding at a molecular level.

In laser brazing, the filler material is heated with a laser, which can provide accurate, controllable heating. However, one problem with current laser brazing processes is that, upon cooling and solidifying, the filler material forms pores, some of which can break the surface of the brazed joint. With conventional laser brazing processes, it is estimated that between 2 and 4% of the brazed joint comprises surface-breaking pores. Porosity is thought to be caused by small impurities in the filler material, impurities or defects in the surfaces to be joined and the laser brazing process itself. By lowering the impurities in the filler material and the contamination of the surfaces, the percentage of surface-breaking pores can be lowered to around 2%. Surface-breaking pores can be eliminated by mechanically working the brazed joint (e.g. polishing, grinding or filling), but this technique is time-consuming and labour-intensive. Pores in the brazed joint will tend to have negative effects on the physical properties (e.g. strength) of the joint, and surface-breaking pores are a particular problem in applications requiring a smooth finish. Furthermore, in conventional laser brazing, rings or herring-bone patterns can form on the surface of the filler material as it cools.

JP 7211424 discloses a soldering technique in which a laser beam is split so that a workpiece having high heat capacity is pre-heated by a first laser beam before being soldered by a second laser beam. This avoids problems associated with sharp partial preheating of the workpiece.

JP 63168272 discloses a method for removing pinholes in brazed parts by using a laser heat source to remelt a defective fused zone.

US 2004/009964 discloses a system for laser beam welding comprising a laser beam welder and a TIG welder, wherein the TIG welder is used for re-melting a portion of the bead obtained from the laser welder.

However, a need remains for an efficient method for laser brazing in which pore-formation and undesired surface patterns in the brazed joint can be reduced, in particular in which the presence of surface-breaking pores can be reduced or eliminated entirely. This is especially relevant for brazed joints which are to be painted, as surface irregularities or surface-breaking pores may also be evident after painting. The method should provide a simple, economical solution and should be easily compatible with existing processes, particularly the high-speed processes used for mass-produced goods.

SUMMARY OF THE INVENTION

The present invention provides a method for laser brazing a first member to a second member using a laser brazing head. The laser brazing head has first means for providing a first laser beam and second means for providing a second laser beam. The method comprises the steps of:
  a. arranging the first member in contact with the second member such that a junction is formed therebetween;
  b. providing a filler material in the vicinity of said junction, and
  c. passing said laser brazing head along said junction such that said first laser beam melts said filler material to at least partially fill said junction to form a brazed joint, and said second laser beam effects a post heat treatment of said brazed joint.

Suitably, the energy per unit area (=intensity) provided by the first laser beam is greater than or equal to the energy per unit area provided by the second laser beam. For example, the energy per unit area provided by the first laser beam may be twice, five times or ten times greater than the energy per unit area provided by the second laser beam.

In one aspect, the filler material is allowed to solidify after being melted by the first laser beam and before being post heat treated by the second laser beam.

The first means and the second means for providing the first and second laser beams may be linked individually to separate laser sources. Alternatively, the first and second means may be linked to a single laser source.

In one embodiment, the filler material is selected from the group comprising silver, tin, copper, zinc, aluminium and their alloys.

The laser brazing head is passed along the junction at a speed which is suitably between 0.2 and 8 m/minute, preferably between 1 and 3.5 m/minute. The centre-to-centre distance A between the first and second laser beams in the direction of travel of the laser brazing head where they impact the junction lies between 1 and 50 mm, preferably between 3 and 15 mm.

A flux may also be provided in the vicinity of said junction. In a particular embodiment, the brazing head also comprises means for providing a filler material in the vicinity of the junction.

The term "brazing" refers to a method of joining two materials. A filler material is introduced to the junction between the two materials and then melted to form a brazed joint. The difference between brazing and soldering is that the filler material (solder) used in soldering has a lower melting point; however, in the present invention, the term "brazing" is meant to cover both soldering and brazing processes.

DETAILED DESCRIPTION OF PREFERRED EMBODIMENTS

Figure 1A:
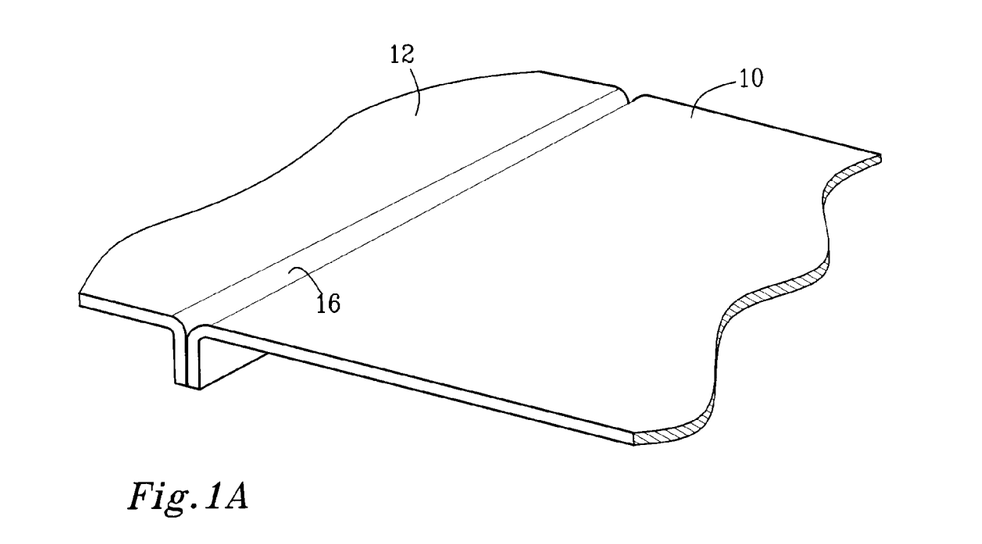
FIGS. 1a-1c illustrate the method of the invention.
Figure 1B:
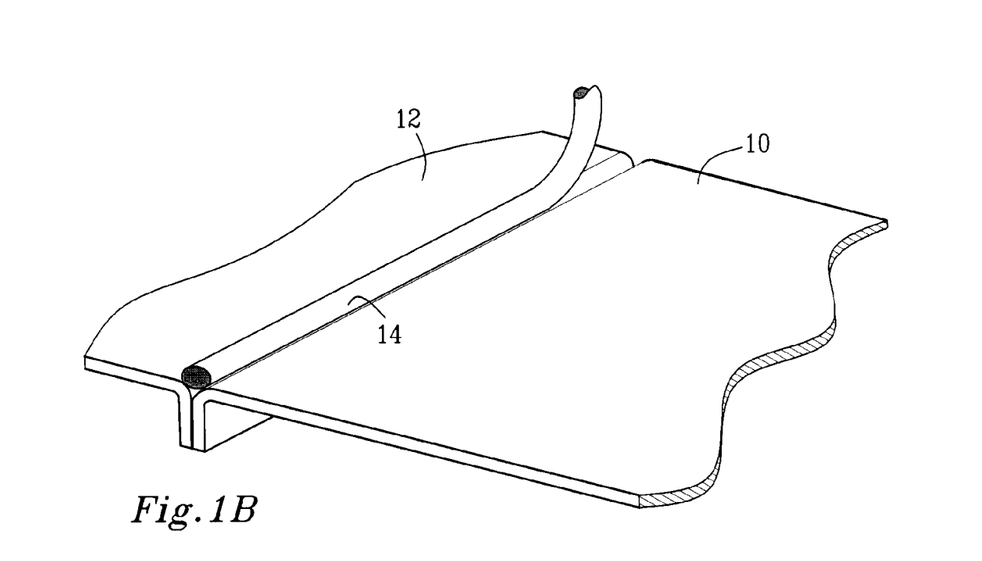
Figure 1C:
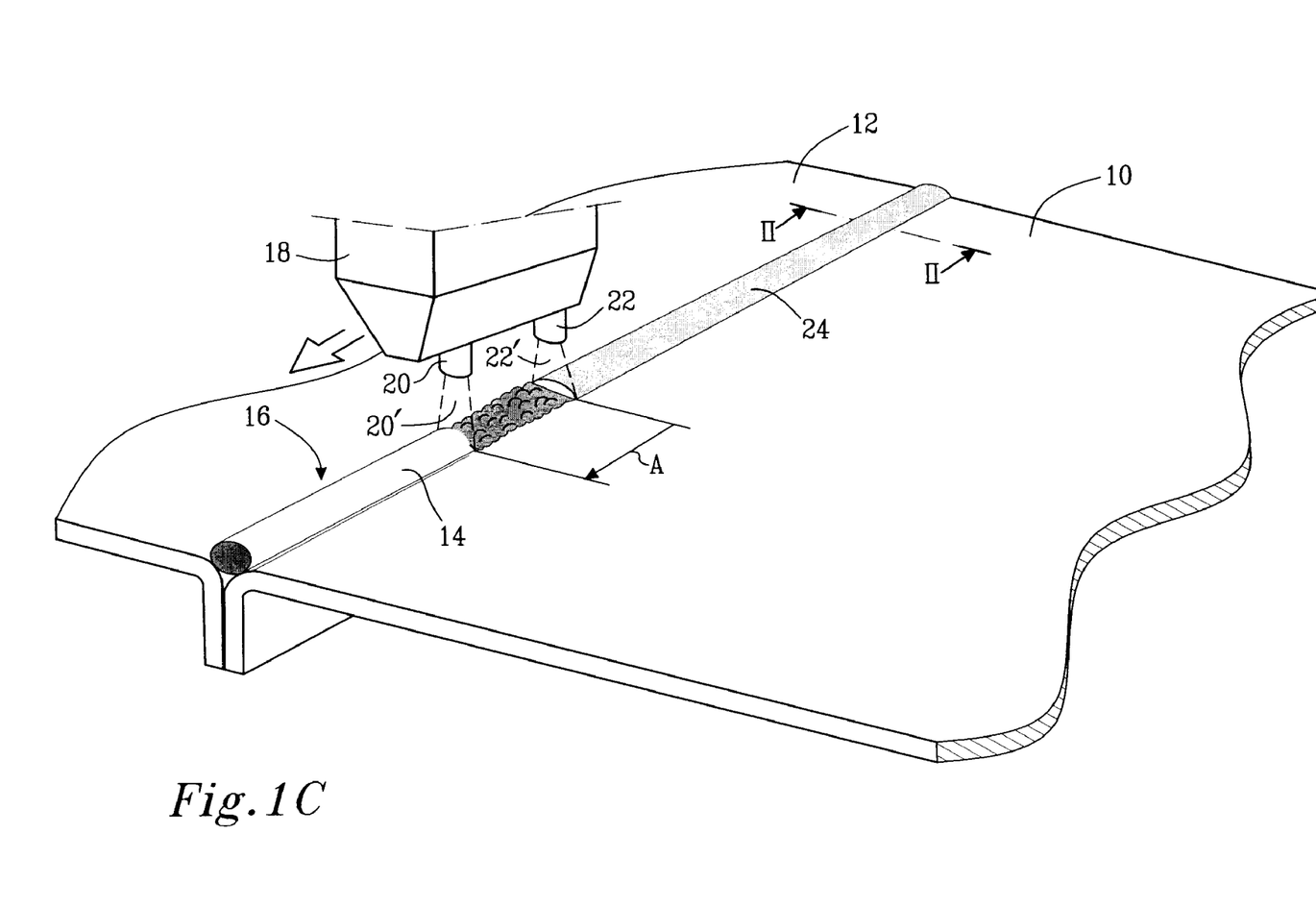

FIGS. 1a-1c illustrate the general method according to the invention. The first step of the method is to arrange a first member 10 in contact with a second member 12, such that a junction 16 is formed therebetween.

Figure 4:
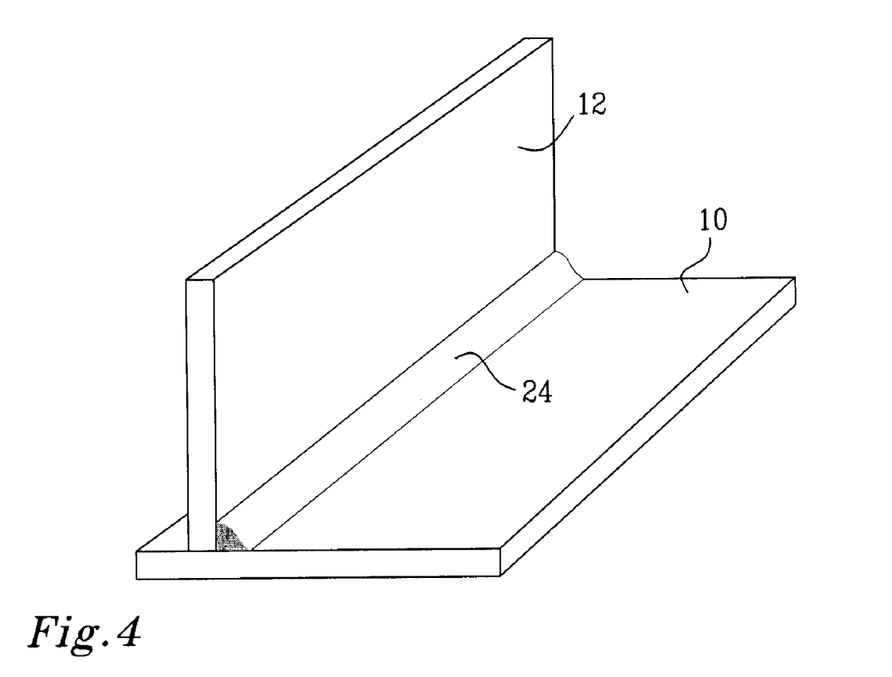
FIGS. 4 and 5 show alternative arrangements of the joint.

FIG. 1a shows a simple construction in which the first member 10 and the second member 12 abut one another at their ends (beam trap seam). However, the precise arrangement of the two members 10, 12 is not important, and they may be arranged so that the end of one member abuts a larger face of another member (fillet seam—see FIG. 4) or in an overlapping fashion (edge seam—see FIG. 5). To obtain the strongest brazed joints 24, the surfaces of the first and second members 10, 12 should be clean and substantially free from oxides.

The first and second members 10, 12 can be made of any material which is compatible with the brazing process. The two members are preferably made of iron or alloys thereof, which are particularly suited to brazing. Aluminium, copper and zinc, as well as their alloys, may also be brazed through this technique. The first and second members do not have to be of the same material—for example the first member may be made of steel while the second member is made of aluminium.

A filler material 14 is provided in the vicinity of the junction 16 between the first and second members 10, 12, as shown in FIG. 1b. The filler material 14 may be laid according to any method known in the art. Preferably, the filler material 14 is in the form of a wire which is provided in the vicinity of the junction 16. The filler material 14 need not be provided continuously along the junction 16; however a better result might be obtained when the filler material 14 is provided continuously along the junction 16.

Figure 3:
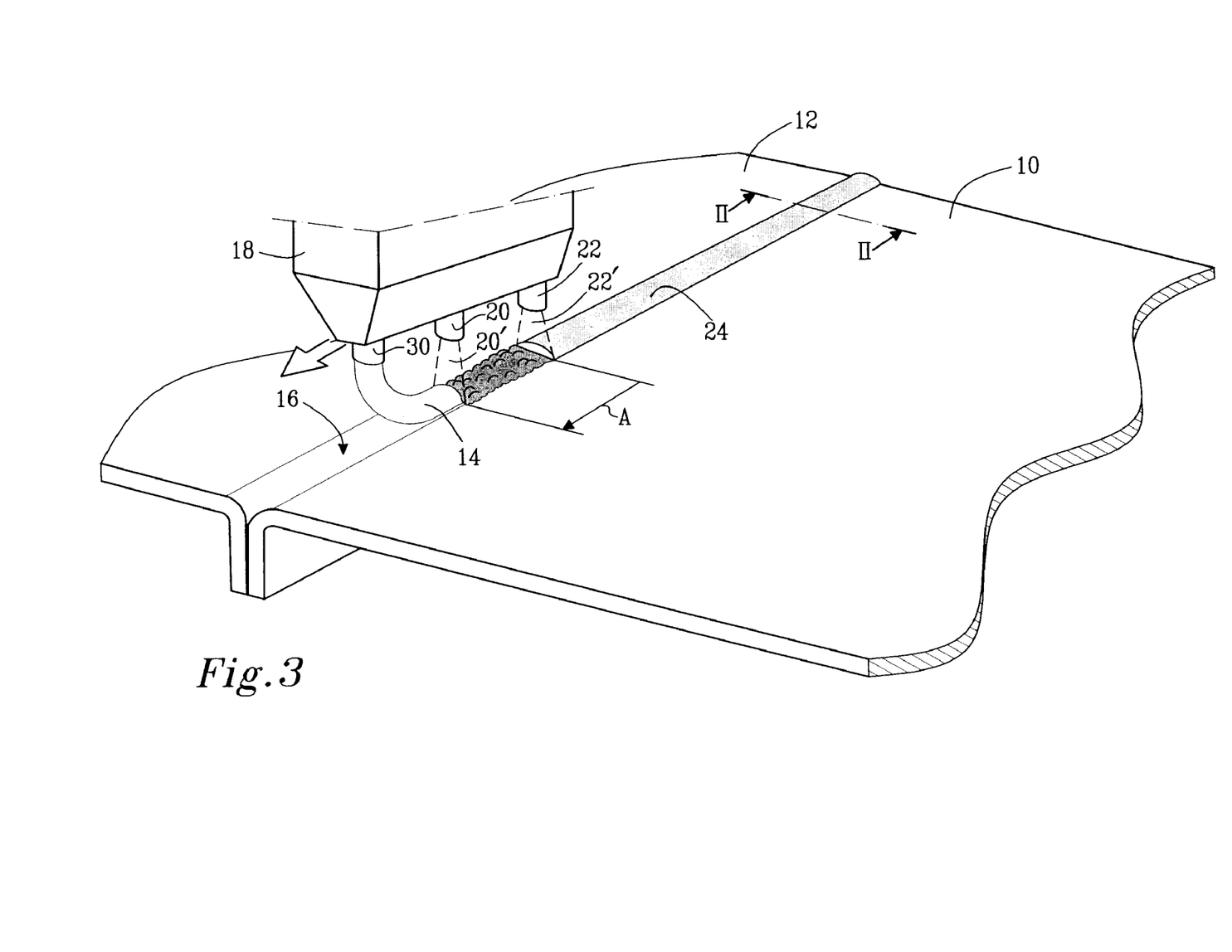
FIG. 3 illustrate a particular embodiment of the method of the invention.

In one alternative, shown in FIG. 3, the brazing head 18 also comprises means 30 for providing filler material 14 in the vicinity of the junction 16. Thus, filler material 14 can be provided and the joint brazed in one traverse of the laser brazing head 18. Line feed can be used for providing filler material 14.

A variety of filler materials 14 can be used in the present invention. The choice of filler material 14 usually depends on the materials to be brazed. Silver, tin, copper, zinc, aluminium and their alloys are particularly suitable filler materials 14. Alloys of these metals with one another are also suitable. Copper alloys are particularly suitable as filler material 14.

In certain circumstances, it is of interest to apply a low voltage between the means 30 for providing filler material 14 and the first and second members 10, 12. This causes a current to flow in the filler material 14, which therefore heats up. The filler material 14 is thus pre-warmed. This improves its flexibility and assists in the laying of the filler material 14. At the same time, subsequent laser brazing is improved, and defects due to rapid local warming of the filler material 14 can be reduced.

Once the filler material 14 has been provided in the vicinity of the junction 16, a laser brazing head 18 is passed along the junction 16 (see FIG. 1c). The laser brazing head 18 has first means 20 for providing a first laser beam 20' and second means 22 for providing a second laser beam 22'.

The first means 20 and the second means 22 for providing the first and second laser beams 20', 22' may be linked individually to separate laser sources 21,23 (not shown). These laser sources need not necessarily be located in the laser brazing head itself, although this is a possibility. In the interests of saving weight in the laser brazing head, the separate laser sources 21, 23 are preferably located elsewhere than in the laser brazing head and linked to the first and second means 20,22 by optic fibres or other optical systems.

Alternatively, the first and second means 20, 22 for providing the first and second laser beams 20', 22' are both linked to a single laser source. In other words, a single laser source is split with the use of appropriate optics and the output is linked to the first and second means 20,22. Beam-splitting can be carried out by using standard optics, as will be understood by the person skilled in the art. Again, this single laser source need not be located in the laser brazing head itself, but may in the interests of saving weight be located elsewhere and linked to the first and second means 20,22 by optic fibres or other optical systems. This embodiment has the advantage that only one laser source is required, which gives energy savings in the brazing process. Furthermore, with this embodiment, a conventional laser brazing head with a single laser source can be easily rebuilt by providing the relevant optics to provide a laser brazing head 18 according to the present invention.

Figure 2:
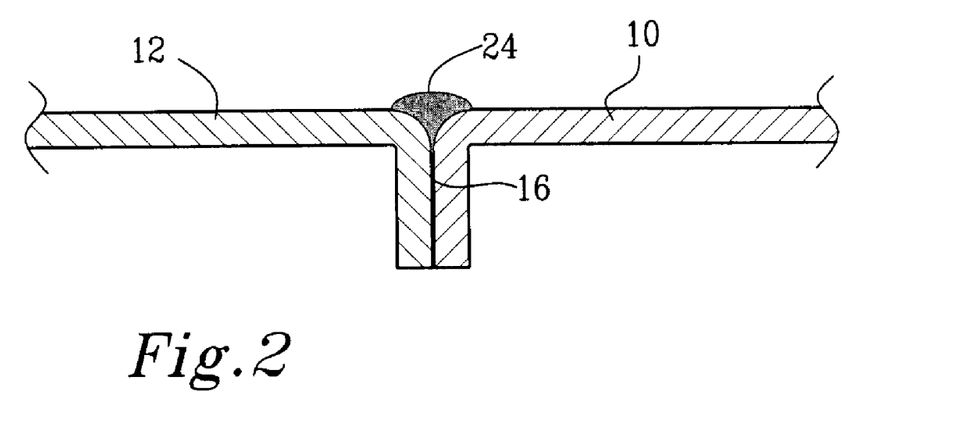
FIG. 2 is a cross-sectional view along the line II-II in FIG. 1c.

The laser brazing head 18 is passed along the junction 16 such that the first laser beam 20' melts the filler material 14 to at least partially fill the junction 16 to form a brazed joint 24. The second laser beam 22' then effects a post heat treatment of said brazed joint 24 (see FIG. 1c). FIG. 2 is a cross-sectional view along the line II-II in FIG. 1c.

With such a post heat treatment, brazed joints can be produced which have generally fewer pores, and few or no surface-breaking pores. A single pass of the laser brazing head 18 over the junction 16 is sufficient to provide significant improvements in the quality of the brazed joint. Furthermore, the fact that a single laser brazing head 18 can be used to provide a brazed joint of high quality means that no extra finishing steps such as polishing or grinding are required. The process of the present invention is highly compatible with existing manufacturing processes in which a brazing step is involved.

The energy per unit area (=intensity) of the laser beams 20' 22' at the junction 16 has a Gaussian distribution. As one crosses the laser beam from one edge to the other through the centre, the intensity increases continuously to a maximum at the centre before decreasing again after the centre. When comparing the intensity of the laser beams 20', 22', it is therefore important to compare like with like (i.e. measurements made at a given point in the first laser beam 20' must be compared with those made at the corresponding point in the second laser beam 22').

The energy per unit area (=intensity) provided by the first laser beam 20' at the junction 16 should be greater than or equal to the energy per unit area provided by the second laser beam 22'. For example, the energy per unit area provided by the first laser beam 20' may be twice, five times or ten times the energy per unit area provided by the second laser beam 22'. Such an arrangement ensures that the second laser beam 22' only provides a post heat treatment rather than melting the filler material 14 completely.

Figure 6:
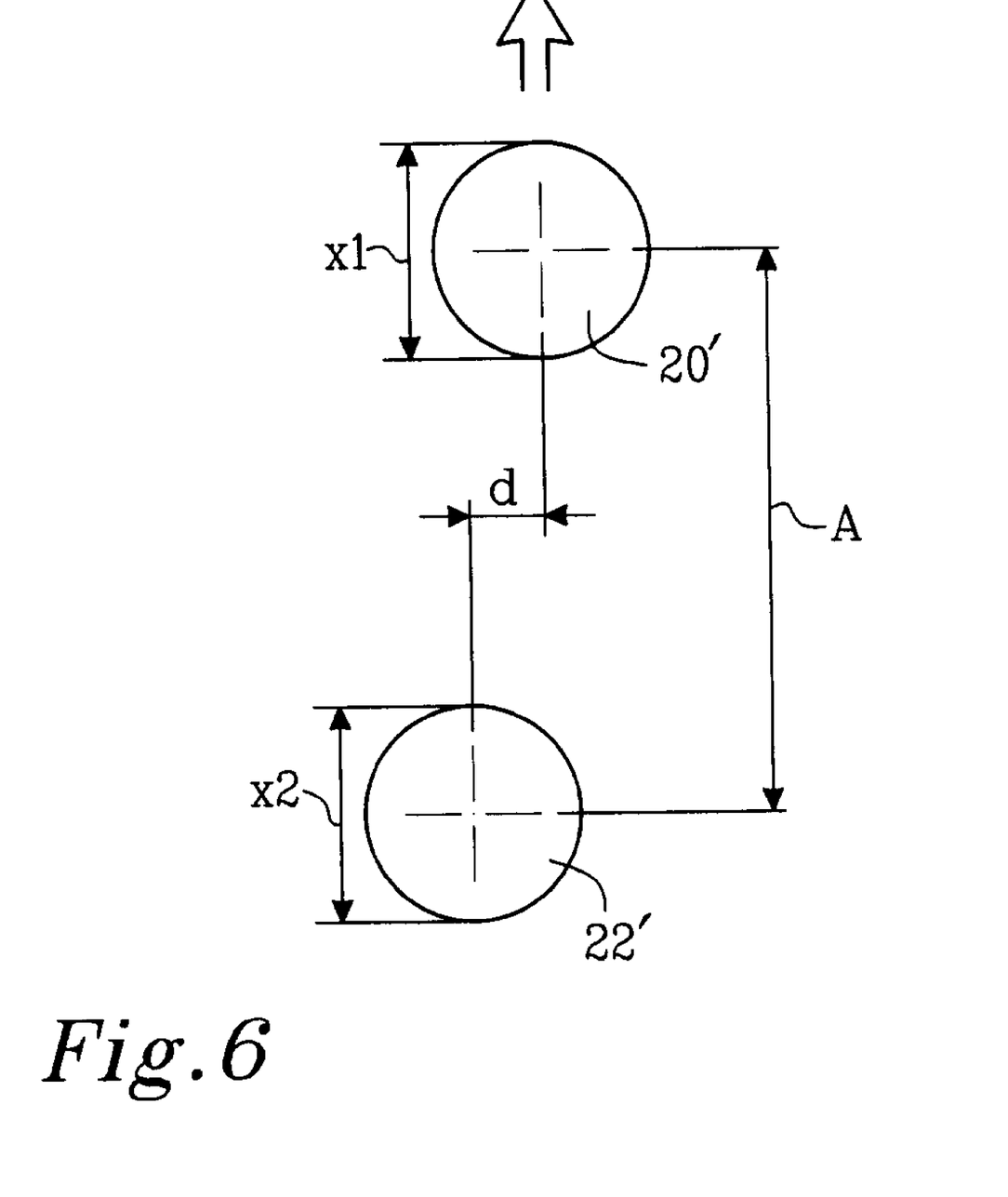
FIG. 6 illustrates the relative positions of the two laser beams on the surface of the junction.

FIG. 6 illustrates the relative positions of the two laser beams 20' 22' on the surface of the junction 16. In this illustration, the direction of travel of the laser brazing head 18 is indicated by the arrow. The centre-to-centre distance between the laser beams on the surface of the junction 16 (in the direction of travel of the laser brazing head 18) is given by distance A. In certain cases—as explained below—it is of interest that the centre points of the two laser beams are offset with respect to one another in a direction perpendicular to the direction of travel of the laser brazing head 18. This offset is indicated as d. The diameters of the first and second laser beams are given by x1 and x2, respectively, and are commonly between 2-3 mm at the junction 16.

The speed of the laser brazing head 18, the time gap between the first and second laser beams 20', 22' impacting the junction 16 and distance A between the laser beams 20', 22' at the junction 16 are interlinked. Fast movement of the laser brazing head 18 over the junction 16 will lead to shorter time between impact of the two laser beams for a given distance A between the two beams.

The laser brazing head 18 is passed along the junction 16 at a speed which is suitably between 0.2 and 8 m/minute, preferably between 1 and 3.5 m/minute. The distance A between the first and second laser beams 20', 22' where they impact the junction 16 preferably lies between 1 and 50 mm, preferably between 3 and 15 mm.

The above has consequences for the fate of the filler material 14 between the first laser beam 20' and the second laser beam 22'. Passing the brazing head 18 quickly over the junction 16, or providing the two laser beams 20', 22' with a relatively small separation distance A, will not allow the filler material 14 to solidify completely before it is post heat treated by the second laser beam 22'. Best results are obtained when the filler material 14 is allowed to solidify after being melted by the first laser beam 20' and before being post heat treated by the second laser beam 22'. This may be achieved by passing the laser brazing head relatively slowly over the junction 16 (e.g. 2-5 m/minute) or providing a larger separation distance A between the laser beams 20', 22' (e.g. 10-30 mm).

Optimal results are achieved when the laser brazing head 18 is moved at a speed of between 1 and 3.5 m/minute, and the laser beams 20', 22' are separated by a distance A of between 3 and 15 mm.

Figure 5:
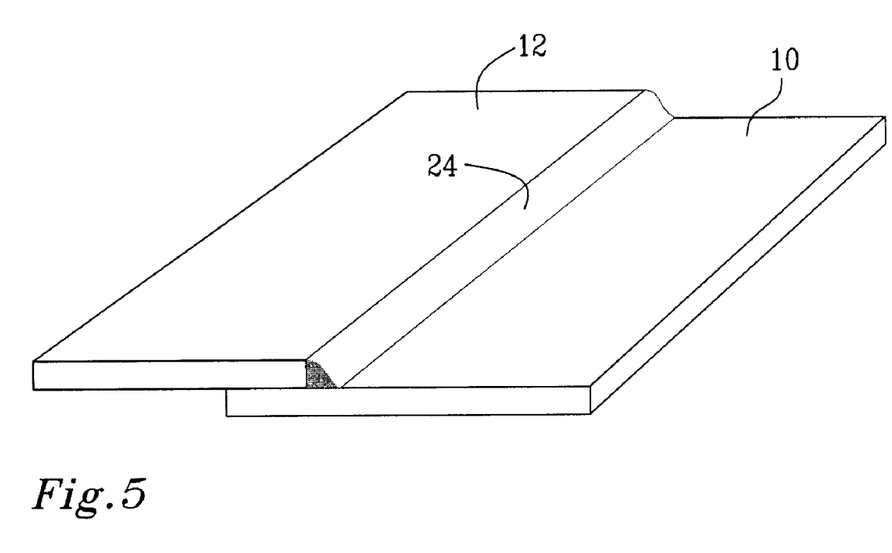

Different arrangements of the first and second members 10, 12 may require different alignments of the first and second laser beams 20',22'. For instance, when an edge seam such as that in FIG. 5 is brazed, the first laser beam 20' may be directed so that the upper of the first and second member 10, 12 is heated more than the lower. In this way, filler material 14 preferably flows downwards into the junction 16 rather than upwards. The second laser beam 22' is then directed into the brazed joint 24 itself, so that the brazed joint 24 is post heat treated directly on its surface. The offset d between the two laser beams (FIG. 6) can be varied to provide the desired effect.

Brazing often takes place in the presence of a flux, which hinders the formation of oxides during the brazing process. Accordingly, in one embodiment of the method according to the invention, a flux is also provided in the vicinity of the junction 16. Preferred materials for use as fluxes are borax-based fluxes. However, standard laser brazing techniques are so fast that fluxes are usually not necessary.

The laser brazing process of the present invention may take place in an inert atmosphere so as to minimize combustion risks. Argon, nitrogen or helium may be used as the inert atmosphere.

During laser brazing, the first and second members 10, 12 can be clamped together. Alternatively, the laser brazing head 18 is equipped with at least one means to apply pressure (e.g. wheel or finger) to the first or second members 10, 12. This is arranged so that it contacts the first or second members at least before the first laser beam 20'. These pressure wheels or fingers apply an even force to the first and second members 10, 12 so that they are in close contact when brazed. They also help the laser brazing head 18 to maintain a set distance from the first and second members 10, 12.

The laser brazing head 18 may also comprise means for following the junction 16, and to ensure that the laser brazing head 18 remains aligned with the junction 16. In its simplest form, this comprises a pointer which is arranged so that—during brazing—it runs along the junction 16, in a similar way to a needle on a gramophone player. A more complex junction-following means may use optics to maintain alignment of the laser brazing head 18 with the junction 16.

EXAMPLE

Typically the set-up for laser brazing two materials together includes two steel sheet materials and a copper alloy filler wire, $CuSi_3$. The two materials are clamped together with a clamping wheel or by a movable/indexing fixture to form a joint without gaps. The twinspot beam is usually generated by using a wedge lens internally in the standard laser optic, changing the optical path of a part of the beam (typically 20%), creating the second spot. Depending on the brazing speed, the distance between the two spots needs to be adjusted to get optimum effect. At a brazing speed of 2 m/min, a typical distance between the two spots are 8-10 mm in order to get a good result, with the second beam spot tracing the center of the seam The present invention should not be considered as limited by the embodiments and figures described herein. Rather, the full scope of the invention should be determined by the appended claims, with reference to the description.

The invention claimed is:

1. A method for laser brazing a first member to a second member using a laser brazing head having first means for providing a first laser beam and second means for providing a second laser beam, the method comprising the steps of:
    arranging said first member in contact with said second member such that a junction is formed therebetween;
    providing a filler material in the vicinity of said junction;
    passing said laser brazing head along said junction such that said first laser beam melts said filler material to at least partially fill said junction to form a brazed joint, and said second laser beam effects a post heat treatment of said brazed joint;
    allowing the filler material to solidify after being melted by the first laser beam prior to effecting a post heat treatment of the brazed joint by the second laser beam; and
    wherein the energy per unit area provided by the first laser beam is greater than or equal to at least twice the energy per unit area provided by the second laser beam.

2. A method according to claim 1, wherein first means and the second means for providing the first and second laser beams are linked individually to separate laser sources.

3. A method according to claim 1, wherein the first and second means are linked to a single laser source.

4. A method according to claim 1, wherein the filler material is selected from the group comprising silver, tin, copper, zinc, aluminium and their alloys.

5. A method according to claim 1, wherein the laser brazing head is passed along the junction at a speed of between 1 and 3.5 m/minute.

6. A method according to claim 1, wherein the center-to-center distance A between the first and second laser beams in the direction of travel of the laser brazing head where they impact the junction lies between 1 and 50 mm.

7. A method according to claim 6, wherein the center-to-center distance A between the first and second laser beams in the direction of travel of the laser brazing head where they impact the junction lies between 3 and 15 mm.

8. A method according to claim 1, wherein a flux is also provided in the vicinity of said junction.

9. A method according to claim 1, wherein the brazing head also comprises means for providing a filler material in the vicinity of the junction.

10. A method for laser brazing a first member to a second member using a laser brazing head the method comprising the steps of:
   providing the laser brazing head with a first laser beam and a second laser beam, the first laser beam and the second laser beam spaced from one another wherein the spacing of the second laser beam from the first laser beam is based on the speed of travel of the brazing head, the first laser beam and the second laser beam linked to and generated from a single laser source, wherein the energy per unit area provided by the first laser beam is greater than or equal to at least twice the energy per unit area provided by the second laser beam;
   arranging the first member in contact with the second member such that a junction is formed therebetween;
   providing a filler material in the vicinity of said junction;
   passing said laser brazing head along said junction such that the first laser beam melts the filler material to at least partially fill said junction to form a brazed joint and the second laser beam follows the first laser beam and effects a post heat treatment of the brazed joint; and
   allowing the filler material to solidify after being melted by the first laser beam prior to effecting a post heat treatment of the brazed joint by the second laser beam.

11. A method according to claim 10, wherein the laser brazing head is passed along the junction at a speed of between 1 and 3.5 m/minute and a center-to-center distance A between the first and second laser beams in the direction of travel of the laser brazing head where they impact the junction lies between 3 mm and 15 mm.

12. A method according to claim 11, wherein the filler material is selected from the group comprising silver, tin, copper, zinc, aluminium and their alloys.

* * * * *